United States Patent [19]
Tomita

[11] Patent Number: 5,208,694
[45] Date of Patent: May 4, 1993

[54] OPTICAL SCANNER

[75] Inventor: Kan Tomita, Tokyo, Japan

[73] Assignee: Ricoh Company, Ltd., Tokyo, Japan

[21] Appl. No.: 791,547

[22] Filed: Nov. 14, 1991

[30] Foreign Application Priority Data

Nov. 29, 1990 [JP] Japan ................... 2-332720
Jun. 3, 1991 [JP] Japan ................... 3-131267

[51] Int. Cl.$^5$ ............................................. G02B 26/08
[52] U.S. Cl. ................................. 359/216; 359/207
[58] Field of Search ............... 359/207, 216, 217, 218, 359/219, 206; 250/235, 236

[56] References Cited

U.S. PATENT DOCUMENTS

| | | | |
|---|---|---|---|
| 4,720,632 | 1/1988 | Kaneko .......................... | 359/218 |
| 4,722,581 | 2/1988 | Hamada et al. ............... | 359/218 |
| 5,033,806 | 7/1991 | Tomita et al. ................. | 359/216 |
| 5,054,866 | 10/1991 | Tomita et al. ................. | 359/218 |

*Primary Examiner*—Loha Ben
*Attorney, Agent, or Firm*—Oblon, Spivak, McClelland, Maier & Neustadt

[57] ABSTRACT

In an optical scanner, an image-forming optical system approximately sets the position of a deflecting/reflecting face of a rotary polygon mirror and the position of a scanned face in a conjugate relation in geometrical optics in a cross scan-corresponding direction. This optical system has a function for converging a deflected light beam onto the scanned face in a main scan-corresponding direction. The optical system is set such that the following condition, $W_0/k_2 < R/D < W_0/k_1$ is satisfied, where R designates a distance between the position of a real image and the position of an image of a light emitting section formed by an image-forming element between a laser diode light source and the scanned face; D designates a diameter of an opening image in the cross scan-corresponding direction with respect to the real image; $W_0$ designates a waist diameter of the deflected light beam to be obtained between the real image position and the image position of the light emitting section; $\lambda$ designates a light emitting wavelength of the light source; a wavelength $\lambda$ is set to 780 nm; $k_1$ is equal to $0.67\lambda/\lambda_0$; and $k_2$ is equal to $1.1\lambda/\lambda_0$.

20 Claims, 13 Drawing Sheets

DEFOCUS:-20.00   BEAM DIAMETER:323.3

DEFOCUS:-10.00   BEAM DIAMETER:171.3

DEFOCUS: 0.00     BEAM DIAMETER: 69.5

DEFOCUS: 2.50     BEAM DIAMETER: 79.4

OPTICAL SCANNER

BACKGROUND OF THE INVENTION

1. Field of the Invention

The present invention relates to an optical scanner using a laser diode (LD) light source and a rotary polygon mirror as a deflector and having an aperture between the light source and the rotary polygon mirror.

2. Description of the Related Art

An optical scanner having a laser diode (LD) light source is widely known in association with an optical printer, etc.

A main scan-corresponding direction and a cross scan-corresponding direction used in this specification will first be explained.

An optical arrangement of the optical scanner is developed along the optical axis of an optical element from the light source to a scanned face. An optical path developed in this optical arrangement is called a developed optical path in the following description. A light emitting section of the light source is arranged at a starting point of this developed optical path. The scanned face is arranged at a terminal point of the developed optical path. The developed optical path, a main scanning direction and a cross scanning direction are perpendicular to each other at the terminal point of the developed optical path. The main scan-corresponding direction is set to a direction parallel to the main scanning direction in an arbitrary position of the developed optical path. The cross scan-corresponding direction is set to a direction parallel to the cross scanning direction in an arbitrary position of the developed optical path.

In general, there are the following two known optical scanners using a laser diode light source and classified in accordance with optical characteristics in the main scan-corresponding direction.

In a first kind of optical scanner, a divergent light beam emitted from the laser diode light source is changed to a parallel light beam by a collimator lens as a coupling lens with respect to the main scan-corresponding direction. The parallel light beam is deflected by a rotary polygon mirror and is converged on the scanned face by an image-forming optical system. In this specification, the image-forming optical system is arranged between the rotary polygon mirror and the scanned face and is constructed by a combination system of optical elements forming a light spot on the scanned face by the deflected light beam.

In a second kind of optical scanner, a divergent light beam emitted from the laser diode light source is changed to a convergent light beam by a coupling lens with respect to the main scan-corresponding direction. This convergent light beam is then deflected by a rotary polygon mirror. The deflected light beam is further converged by an image-forming optical system and is formed as a light spot on the scanned face. For example, such an optical scanner is shown in Japanese Patent Application Laying Open (KOKAI) No. 1-302217.

The present invention can be applied to each of these first and second kinds of optical scanners.

The optical scanner using the laser diode light source and the rotary polygon mirror as a deflector has a means for correcting a so-called mirror face inclination of the rotary polygon mirror in many cases. The optical scanner having a function for correcting such a mirror face inclination is classified as follows in accordance with optical characteristics in the cross scan-corresponding direction.

A first optical scanner belongs to the first kind of optical scanner. In this first optical scanner, a parallel light beam emitted from a light source side is converged only in the cross scan-corresponding direction. A linear image extending in the main scan-corresponding direction is formed in the position of a deflecting/reflecting face of the rotary polygon mirror. A deflected light beam is focused and formed by the image-forming optical system as a light spot on the scanned face. The image-forming optical system is constructed by an anamorphic f θ lens for approximately providing a conjugate relation in geometrical optics with respect to positions of the deflecting/reflecting face and the scanned face in the cross-scan corresponding direction. This first optical scanner is called a first type of general optical scanner in the following description.

A second optical scanner belongs to the first or second kind of optical scanner. In this second optical scanner, a light beam emitted from the light source side is focused and formed as a linear image extending in the main scan-corresponding direction. The light beam is then formed by the image-forming optical system as a light spot on the scanned face. An anamorphic image-forming optical system approximately provides a conjugate relation in geometrical optics with respect to positions of the deflecting/reflecting face and the scanned face in the cross-scan corresponding direction. This anamorphic image-forming optical system is constructed by a spherical lens and an elongated lens. This second optical scanner is called a second type of general optical scanner in the following description. For example, as shown in Japanese Patent Publication (KOKOKU) No. 60-642, an elongated cylindrical lens is used as the elongated lens of the image-forming optical system in the second type of general optical scanner. Further, the elongated lens of the image-forming optical system in the second type of general optical scanner can be constructed by an elongated toroidal lens having a special lens face such as a barrel type toroidal lens face. The present invention can be applied to each of the first and second types of general optical scanners.

In the above-mentioned optical scanners, a portion of the light beam emitted from the laser diode light source is generally interrupted by an aperture to interrupt noise light and correct a quantity of light for performing an optical scanning operation and correct the shape of a light spot on the scanned face. An optical scanning operation of high density has recently been performed. A stable light spot having a small diameter is required to realize such an optical scanning operation of high density. The following problems are caused when the stable light spot having a small diameter is used and the above aperture is used.

In the first type of general optical scanner, a real image of the aperture is generally formed in a position separated by 100 mm or more from the scanned face by an image-forming element which is arranged as an optical element having an image-forming action between the aperture and the scanned face. Further, the scanned face is approximately arranged at infinity optically seen from a position of the aperture. Accordingly, the light spot is formed as a Fraunhofer diffraction image in each of the main scan-corresponding direction and the cross scan-corresponding direction. Therefore, a light intensity distribution with respect to the light spot is provided as a clear Gaussian distribution in each of the main and cross scanning directions. Accordingly, there is no problem about an influence of diffraction caused by the aperture.

However, since the light spot is formed as a Fraunhofer diffraction image, it is necessary to increase an opening diameter of the aperture so as to increase a size of the light beam incident to the image-forming optical system constructed by the anamorphic f θ lens when the diameter of the light spot is reduced to perform the optical scanning operation of high density.

The anamorphic f θ lens is arranged in a position separated from the scanned face so that the incident light beam has a large diameter and strict accuracy in the lens face is required. When the size of the incident light beam is further increased as mentioned above to reduce the diameter of the light spot, stricter accuracy in the lens face is required. Therefore, in consideration of cost of the optical scanner, it is not preferable to reduce the diameter of the light spot by improving the accuracy in the lens face of the image-forming optical system in the first type of general optical scanner.

In the second type of general optical scanner, a conjugate magnification $\beta$ in the cross scan-corresponding direction between the deflecting/reflecting face and the scanned face generally satisfies $\beta << 1$. The real image of the aperture is formed in the vicinity of the scanned face in accordance with an arrangement position of the aperture. Accordingly, the light spot is influenced by diffraction caused by the aperture. Therefore, the light intensity distribution of the light spot becomes complicated and the diameter of the light spot is greatly changed by so-called defocus so that no diameter of the light spot is stabilized.

SUMMARY OF THE INVENTION

It is therefore an object of the present invention to provide an optical scanner in which a light spot has a small diameter and is provided as a stable light spot having a clear light intensity distribution.

Another object of the present invention is to provide a compact optical scanner having an improved light utilization efficiency.

In accordance with a first structure of the present invention, the above objects can be achieved by an optical scanner in which a divergent light beam emitted from a laser diode light source is changed by an anamorphic optical system to a parallel or weak convergent light beam in a main scan-corresponding direction and a convergent light beam in a cross scan-corresponding direction, and a portion of the light beam is interrupted by an aperture and the light beam of a light emitting section of the laser diode light source is focused and formed as a linear image extending in the main scan-corresponding direction and is then deflected by a rotary polygon mirror, and the deflected light beam is converged by an image-forming optical system toward a scanned face to obtain a light spot on the scanned face and optically scan the scanned face by this light spot. The image-forming optical system approximately sets the position of a deflecting/reflecting face of the rotary polygon mirror and a position of the scanned face in a conjugate relation in geometrical optics in the cross scan-corresponding direction. The image-forming optical system has a function for converging the deflected light beam onto the scanned face in the main scan-corresponding direction. The optical scanner is constructed such that a real image of the aperture formed by an image-forming element arranged between the aperture and the scanned face is located on a side of the rotary polygon mirror with respect to the scanned face in an entire effective scanning range. An opening diameter and an arrangement position of the aperture, and a focal length and an arrangement position of the anamorphic optical system in the cross scan-corresponding direction are determined such that the following condition, $$W_0/k_2 < R/D < W_0/k_1$$

is satisfied. In this condition, R designates a distance between a position of the real image and a position of the image of the light emitting section of the laser diode light source formed by the image-forming element between the laser diode light source and the scanned face. D designates a diameter of an opening image in the cross scan-corresponding direction with respect to the real image of the aperture. $W_0$ designates a waist diameter of the deflected light beam to be obtained between the position of the real image and the image position of the light emitting section of the laser diode light source. $\lambda$ designates a light emitting wavelength of the laser diode light source. A wavelength $\lambda_0$ is set to 780 nm. $k_1$ is equal to $0.67\lambda/\lambda_0$. $k_2$ is equal to $1.1\lambda/\lambda_0$.

In accordance with a second structure of the present invention, the above objects can be also achieved by an optical scanner in which a divergent light beam emitted from a laser diode light source is changed by an anamorphic optical system to a parallel or weak convergent light beam in a main scan-corresponding direction and a convergent light beam in a cross scan-corresponding direction, and a portion of the light beam is interrupted by an aperture and the light beam of a light emitting section of the laser diode light source is focused and formed as a linear image extending in the main scan-corresponding direction and is then deflected by a rotary polygon mirror, and the deflected light beam is converged by an image-forming optical system toward a scanned face to obtain a light spot on the scanned face and optically scan the scanned face by this light spot. The image-forming optical system approximately sets the position of a deflecting/reflecting face of the rotary polygon mirror and a position of the scanned face in a conjugate relation in geometrical optics in the cross scan-corresponding direction. The image-forming optical system has a function for converging the deflected light beam onto the scanned face in the main scan-corresponding direction. An opening diameter and an arrangement position of the aperture, and a focal length and an arrangement position of the anamorphic optical system in the cross scan-corresponding direction are determined such that a real image of the aperture formed by an image-forming element arranged between the aperture and the scanned face is located on a side of the rotary polygon mirror with respect to the scanned face in an entire effective scanning range; the image of the light emitting section of the laser diode light source formed by the image-forming element between the laser diode light source and the scanned face is located on a side opposite to the real image of the aperture with respect to the scanned face in the entire effective scanning range; and such that a waist position of the deflected light beam is located between the image of the light emitting section and the real image of the aperture on the side of the rotary polygon mirror with respect to the scanned face.

In accordance with a third structure of the present invention, the above objects can be also achieved by an optical scanner in which a divergent light beam emitted from a laser diode light source is changed by an anamorphic optical system to a parallel or weak convergent light beam in a main scan-corresponding direction and a convergent light beam in a cross scan-corresponding direction, and a portion of the light beam is interrupted by an aperture and the light beam of a light emitting section of the laser diode light source is focused and formed as a linear image extending in the main scan-corresponding direction and is then deflected by a rotary polygon mirror, and the deflected light beam is converged by an image-forming optical system toward a scanned face to obtain a light spot on the scanned face and optically scan the scanned face by this light spot. The image-forming optical system approximately sets the position of a deflecting/reflecting face of the rotary polygon mirror and a position of the scanned face in a conjugate relation in geometrical optics in the cross scan-corresponding direction. The image-forming optical system has a function for converging the deflected light beam onto the scanned face in the main scan-corresponding direction. The optical scanner is constructed such that a real image of the aperture formed by an image-forming element arranged between the aperture and the scanned face is located on a side of the rotary polygon mirror with respect to the scanned face in an entire effective scanning range. An opening diameter and an arrangement position of the aperture, and a focal length and an arrangement position of the anamorphic optical system in the cross scan-corresponding direction are determined such that the following condition, $$0.25 < \sqrt{[R \cdot \lambda]/D} < 0.75$$

is satisfied. In this condition, $\sqrt{[\ ]}$ means a square root of a value within the bracket []. R designates a distance between a position of the real image and a position of the image of the light emitting section of the laser diode light source formed by the image-forming element between the laser diode light source and the scanned face. D designates a diameter of an opening image in the cross scan-corresponding direction with respect to the real image of the aperture. $\lambda$ designates a light emitting wavelength of the laser diode light source.

In accordance with the above-mentioned structures of the present invention, it is possible to provide an optical scanner in which the light spot has a small diameter and is provided as a stable light spot having a clear light intensity distribution. Further, it is possible to provide a compact optical scanner having an improved light utilization efficiency.

Further objects and advantages of the present invention will be apparent from the following description of the preferred embodiments of the present invention as illustrated in the accompanying drawings.

DESCRIPTION OF THE PREFERRED EMBODIMENTS

Figure 1A:
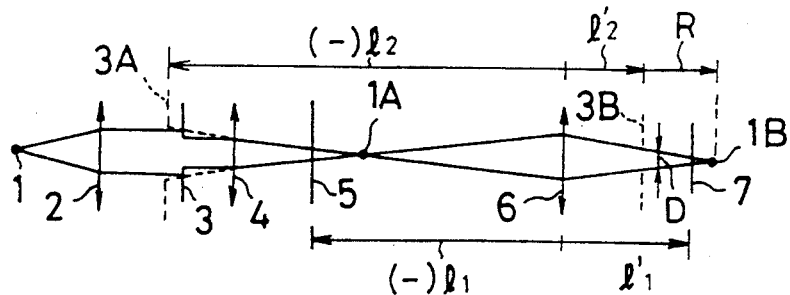
FIGS. 1a to 1e are views for explaining an optical scanner of the present invention.

The preferred embodiments of an optical scanner in the present invention will next be described in detail with reference to the accompanying drawings.

In an optical scanner of the present invention, a divergent light beam emitted from a laser diode light source is changed by an anamorphic optical system to a parallel or weak convergent light beam in a main scan-corresponding direction and a convergent light beam in a cross scan-corresponding direction. A portion of the light beam is interrupted by an aperture and the light beam of a light emitting section of the laser diode light source is focused and formed as a linear image extending in the main scan-corresponding direction and is then deflected by a rotary polygon mirror. The deflected light beam is converged by an image-forming optical system toward a scanned face to obtain a light spot on the scanned face and optically scan the scanned face by this light spot.

The image-forming optical system approximately sets the position of a deflecting/reflecting face of the rotary polygon mirror and a position of the scanned face in a conjugate relation in geometrical optics in the cross scan-corresponding direction. The image-forming optical system has a function for converging the deflected light beam onto the scanned face in the main scan-corresponding direction.

The light beam from the laser diode light source is changed by the anamorphic optical system to a weak convergent light beam in the main scan-corresponding direction. This means that the convergent light beam is converged such that a convergent position of the light beam is located backward from the scanned face seen from a light source side.

As mentioned above, the present invention can be applied to each of the first and second kinds of optical scanners with respect to the main scan-corresponding direction. The present invention can be applied to each of the first and second types of general optical scanners with respect to the cross scan-corresponding direction. Namely, the image-forming optical system may be constructed by an anamorphic f θ lens or a combination of a spherical lens and various kinds of elongated lenses.

The optical scanner having a first structure of the present invention has the following features.

Namely, a real image of the aperture formed by an image-forming element arranged between the aperture and the scanned face is located on a side of the rotary polygon mirror with respect to the scanned face in an entire effective scanning range. An opening diameter and in arrangement position of the aperture, and a focal length and an arrangement position of the anamorphic optical system in the cross scan-corresponding direction are determined such that the following condition $$W_0/k_2 < R/D21\ W_0 k_1$$

is satisfied. In this condition, R designates a distance between a position of the real image and a position of the image of the light emitting section of the laser diode light source formed by the image-forming element between the laser diode light source and the scanned face. D designates a diameter of an opening image in the cross scan-corresponding direction with respect to the real image of the aperture. $W_0$ designates a waist diameter of the deflected light beam to be obtained between the position of the real image and the image position of the light emitting section of the laser diode light source. $\lambda$ designates a light emitting wavelength of the laser diode light source. A wavelength $\lambda_0$ is set to 780 nm. $k_1$ is equal to $0.67\lambda/\lambda_0$. $k_2$ is equal to $1.1\lambda/\lambda_0$.

The optical scanner having a second structure of the present invention has the following features.

Namely, an opening diameter and an arrangement position of the aperture, and a focal length and an arrangement position of the anamorphic optical system in the cross scan-corresponding direction are determined such that a real image of the aperture formed by an image-forming element arranged between the aperture and the scanned face is located on a side of the rotary polygon mirror with respect to the scanned face in an entire effective scanning range. The opening diameter and the arrangement position of the aperture, and the focal length and the arrangement position of the anamorphic optical system in the cross scan-corresponding direction are also determined such that the image of the light emitting section of the laser diode light source formed by the image-forming element between the laser diode light source and the scanned face is located on a side opposite to the real image of the aperture with respect to the scanned face in the entire effective scanning range. The opening diameter and the arrangement position of the aperture, and the focal length and the arrangement position of the anamorphic optical system in the cross scan-corresponding direction are further determined such that a waist position of the deflected light beam is located between the image of the light emitting section and the real image of the aperture on the side of the rotary polygon mirror with respect to the scanned face.

The optical scanner having a third structure of the present invention has the following features.

Namely, a real image of the aperture formed by an image-forming element arranged between the aperture and the scanned face is located on a side of the rotary polygon mirror with respect to the scanned face in an entire effective scanning range. An opening diameter and an arrangement position of the aperture, and a focal length and an arrangement position of the anamorphic optical system in the cross scan-corresponding direction are determined such that the following condition, $$0.25 < \sqrt{[R \cdot \lambda]/D} < 0.75$$

is satisfied. In this condition, R designates a distance between a position of the real image and a position of the image of the light emitting section of the laser diode light source formed by the image-forming element between the laser diode light source and the scanned face. D designates a diameter of an opening image in the cross scan-corresponding direction with respect to the real image of the aperture. $\lambda$ designates a light emitting wavelength of the laser diode light source. $\sqrt{[\ ]}$ means a square root of a value within the bracket [ ].

In this specification, a beam waist means a diameter of the light beam in a position in which the light beam diameter defined as a diameter at an intensity level of $1/e^2$ is minimized when a peak intensity value of a light intensity distribution in a cross section of the laser beam is set to 1.

In the optical scanner having a fourth structure of the present invention, a combined rear focal point of the image-forming optical system in the cross scan-corresponding direction is located on the side of the rotary polygon mirror by a distance equal to or greater than $10\lambda_0/\lambda$ mm from the scanned face in the optical scanner having the first or second structure of the present invention.

In the optical scanner having the first, second, third or fourth structure of the present invention, the anamorphic optical system can be constructed by a coupling lens for coupling light from the laser diode light source and a cylindrical lens having refracting power only in the cross scan-corresponding direction. In this case, in the first to third structures of the present invention, the determinations of the focal length and the arrangement position of the anamorphic optical system in the cross scan-corresponding direction mean the determinations of a focal length and an arrangement position of the above cylindrical lens.

When the anamorphic optical system is constructed by the coupling lens and the cylindrical lens in the fifth structure of the present invention, the aperture may be arranged between the coupling lens and the cylindrical lens in accordance with a sixth structure of the present invention. Otherwise, in accordance with a seventh structure of the present invention, the cylindrical lens may be arranged between the coupling lens and the aperture.

In accordance with an eighth structure of the present invention, the coupling lens is constructed by a collimator lens and the aperture is arranged in proximity to the rotary polygon mirror. In this case, the linear image formed by the cylindrical lens can be located in the vicinity of the deflecting/reflecting face of the rotary polygon mirror and can be also located backward from the aperture seen from the laser diode light source.

In accordance with a ninth structure of the present invention, the anamorphic optical system may be constructed by a single lens in the optical scanner having the first, second, third or fourth structure of the present invention.

FIG. 1a shows a case in which the present invention is applied to the second type of general optical scanner. In FIG. 1a, a vertical direction is a cross scan-corresponding direction. A divergent light beam is emitted from a laser diode (LD) light source 1 and is changed to a parallel light beam by a collimator lens 2 as a coupling lens. This parallel light beam is partially interrupted by an aperture 3. The light beam transmitted through an opening of the aperture 3 is incident to a rotary polygon mirror while this light beam is converged in the cross scan-corresponding direction by a cylindrical lens 4 having refracting power only in the cross scan-corresponding direction. This light beam is then reflected on a deflecting/reflecting face 5 of the rotary polygon mirror.

The light beam converged by the cylindrical lens 4 is focused and formed as a linear image 1A extending in a main scan-corresponding direction, i.e., in a direction perpendicular to a paper face. This linear image is provided as an image of a light emitting section of the laser diode light source 1 with respect to the cross scan-corresponding direction. A virtual image 3A of the aperture 3 can be formed by the cylindrical lens 4 and acts as the aperture 3 with respect to an optical system located on the side of a scanned face 7 from the cylindrical lens 4.

The light beam reflected on the deflecting/reflecting face 5 is deflected by rotating the rotary polygon mirror so that this light beam is changed to a deflected light beam. This deflected light beam is converged by an image-forming optical system 6 toward the scanned face 7 and is formed as a light spot on the scanned face 7.

The image-forming optical system 6 forms a real image 3B of the aperture 3 with the virtual image 3A of the aperture 3 as an object. The image-forming optical system 6 also forms an image 1B of the light emitting section of the laser diode light source in the cross scan-corresponding direction with the linear image 1A as an object. This image 1B is an image of the light emitting section of the laser diode light source formed by an image-forming element arranged between the laser diode light source and the scanned face. The deflected light beam is focused and formed as an image on the scanned face with respect to a main scanning direction.

Distances $l_1$, $l_2$, $l_1'$, and $l_2'$ are set as shown in FIG. 1a. Reference numeral $f_2$ designates a combined focal length of the image-forming optical system 6 in the cross scan-corresponding direction. In this case, positions of the deflecting/reflecting face 5 and the scanned face 7 are approximately set by the image-forming optical system 6 in a conjugate relation with respect to the cross scan-corresponding direction. In accordance with such a premise, the following relation is formed.

$$(1/l_1) \approx (1/l_1') + (1/f_2)$$

Further, the distances $l_2$ and $l_2'$ satisfy the following formula.

$$(1/l_2') = (1/l_2) + (1/f_2)$$

Reference numeral D designates a diameter of an opening image of the real image 3B of the aperture 3 in the cross scan-corresponding direction. This diameter D is determined by an opening diameter of the aperture 3 in the cross scan-corresponding direction and a conjugate magnification in the cross scan-corresponding direction provided by the image-forming element arranged between the aperture 3 and the scanned face 7. In this embodiment, this image-forming element is constructed by a combination system of the cylindrical lens 4 and the image-forming optical system 6.

Figure 3:
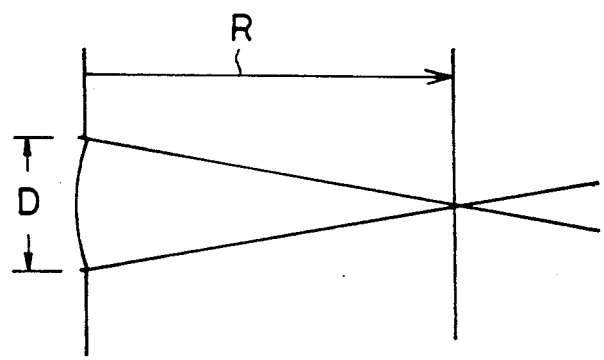
FIG. 3 is a view showing the relation between an opening diameter D of the aperture relative to a real image thereof and a radius R of curvature of a wave surface in a position of the aperture.

In FIG. 1a, reference numeral R designates a distance between the real image 3B of the aperture 3 and the image 1B of the light emitting section of the laser diode light source formed by the image-forming element arranged between the laser diode light source 1 and the scanned face 7. As shown in FIG. 3, a wave surface of the deflected light beam in a position of the real image 3B of the aperture is constructed by a spherical face having a radius R.

The distance from the real image 3B of the aperture to the scanned face 7 is provided by a difference $(l_1' - l_2')$ between the above distances $l_1'$ and $l_2'$. A light intensity distribution of the light spot on the scanned face 7 in the cross scan-corresponding direction can be calculated by integration of diffraction from the real image 3B of the aperture. To execute this integration, it is necessary to know a light intensity distribution in the cross scan-corresponding direction in the position of the real image 3B. The light intensity distribution with respect to the real image 3B is basically provided by multiplying a light intensity distribution in a position of the aperture 3 by a combined conjugate magnification of the image-forming element contributing to the formation of the real image 3B. Aberration caused by the above image-forming element must be strictly considered. However, an F-number (F/No) of the optical system in the optical scanner is generally equal to 50 or more so that it is not necessary to substantially consider the aberration.

As is well known, the light intensity distribution of a laser beam emitted from a laser diode (LD) light source 1 is provided by a Gaussian distribution. The light intensity distribution in the position of the aperture 3 is also considered as the Gaussian distribution if an opening of the coupling lens 2 is sufficiently large. The coupling lens 2 is generally arranged in proximity to the laser diode light source even when the opening of the coupling lens 2 is not sufficiently large. Accordingly, the light intensity distribution in an opening position of the aperture 3 can be also considered as the Gaussian distribution if the opening of the aperture 3 is smaller than that of the coupling lens 2.

A pupil of the coupling lens functions as an aperture when the opening of the coupling lens 2 is sufficiently small. Accordingly, in this case, it is not necessary to dispose a separate aperture since this pupil is considered as the aperture.

Figure 2A:
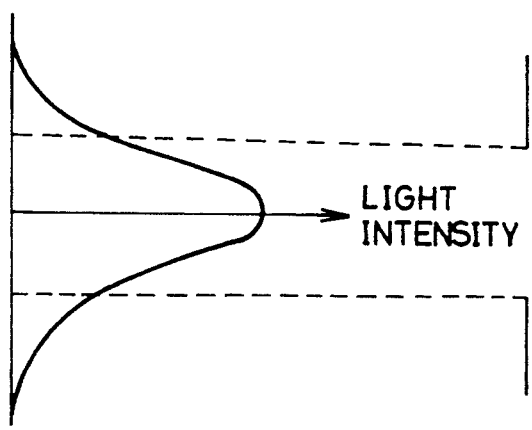
FIGS. 2a and 2b are graphs for explaining interruption of a light beam caused by an aperture.
Figure 2B:
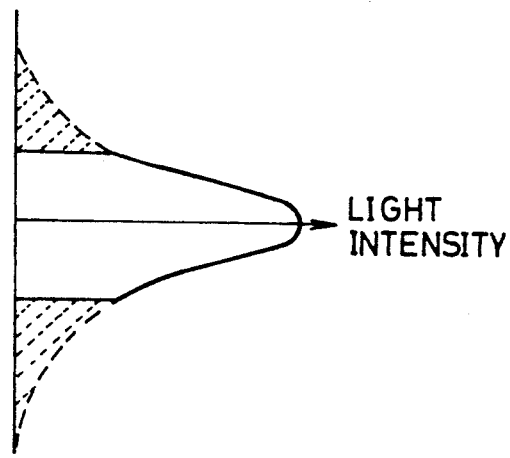

Accordingly, in each of the above-mentioned cases, the light intensity distribution in the opening position of the aperture may be considered as the Gaussian distribution as shown in FIG. 2a. An intensity distribution of light transmitted just after the aperture 3 is provided as a light intensity distribution as shown in FIG. 2b in which a basic portion of the Gaussian distribution shown by broken hatching is cut off in an opening shape. Therefore, the light intensity distribution in the position of the real image 3B can be approximately provided by multiplying the light intensity distribution shown in FIG. 2b by the above conjugate magnification.

FIGS. 6a to 6i concretely show calculated results of the above integration of diffraction. A wavelength of the laser beam emitted from the laser diode light source 1 is set to 780 nm. The distance R between the real image 3B of the aperture 3 and the image 1B of the light emitting section of the laser diode light source is set to 20 or 200 mm. The diameter D of the opening image in the cross scan-corresponding direction with respect to the real image 3B is set such that a ratio R/D is equal to 62.5 with respect to each of R=20 mm and R=200 mm.

Figure 6A:
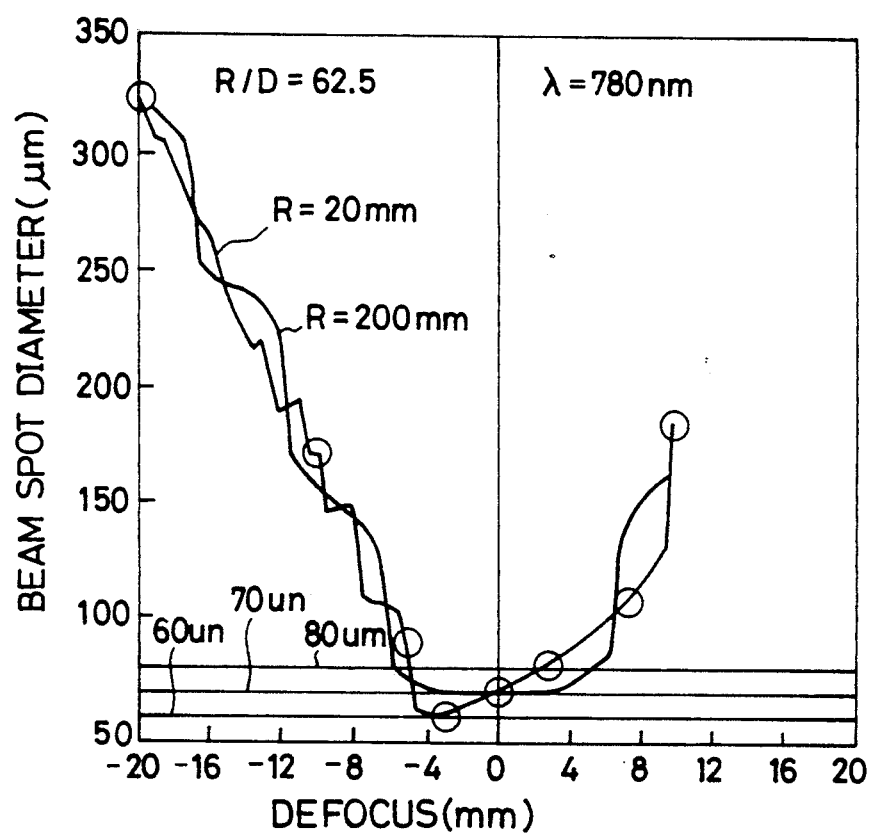
FIGS. 6a to 6i are graphs for explaining the relation between a defocusing amount and the light intensity distribution of a light spot.

In FIG. 6a, the axis of abscissa shows a depth of the image 1B when this depth is negative on a side of the rotary polygon mirror and is positive on a side opposite to this rotary polygon mirror side with a forming position of the image 1B of the light emitting section of the laser diode light source as an origin O. The axis of ordinate shows a diameter of the deflected light beam in the cross scan-corresponding direction at each depth of the image 1B. Thin and thick lines respectively show the above calculated results with respect to R=200 mm and R=20 mm. The opening diameter of the aperture 3 in the cross scan-corresponding direction is set such that a light beam portion having a light intensity value equal to or greater than 80% of a peak intensity value of the light intensity distribution in the opening position in the cross scan-corresponding direction is transmitted through the opening of the aperture Each of FIGS. 6b, 6c, 6d, 6e, 6f, 6g, 6h and 6i shows an intensity distribution of the light beam in the cross scan-corresponding direction when the depth is respectively set to −20 mm, −10 mm, −5 mm, −2.5 mm, 0 mm, 2.5 mm, 7.5 mm and 10 mm and a peak intensity value is normalized to 1.

The light intensity distribution shows a Fraunhofer diffraction image at the depth of 0 mm so that shapes of the light intensity distribution are in conformity with each other irrespective of the distance R. The axis of abscissa shown in each of FIGS. 6b to 6i shows an intensity level ($1/e^2$) in the light intensity distribution and a width of the light intensity distribution on this axis of abscissa provides a diameter of the light beam.

The optical characteristics between the depth and the light beam diameter in the first type of general optical scanner are generally provided as shown by the thin line about R=200 mm in FIG. 6a. The optical scanner of this kind is generally set such that field curvature in the cross scan-corresponding direction is caused around the scanned face in close proximity to this scanned face. Further, this optical scanner is set such that a position of the scanned face is in conformity with the position of a formed image as much as possible. Accordingly, it is considered that the diameter of a light spot is stabilized. However, the distance R has a large value so that the above diameter D has a large value even when the same ratio R/D is set. This means that the deflected light beam is transmitted through a wide region of the image-forming optical system. Accordingly, the diameter of the light spot is greatly influenced by a surface accuracy of the image-forming optical system. Therefore, it is necessary to strictly set the surface accuracy of the image-forming optical system to actually realize the diameter of the light spot in accordance with design in the first type of general optical scanner.

In contrast to this, in the second type of general optical scanner, the distance R is small so that the optical characteristics between the depth and the light beam diameter are provided as shown by the thick line about R=20 mm in FIG. 6a. Accordingly, the light beam diameter can be set to be smaller at the same ratio R/D. The diameter D can be also set to be smaller at the same ratio R/D since the distance R is small. Accordingly, a margin of the surface accuracy of the image-forming optical system is correspondingly increased.

Figure 6B:
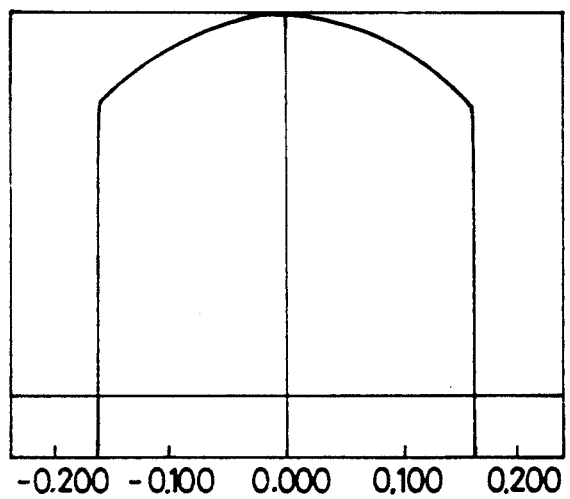
Figure 6C:
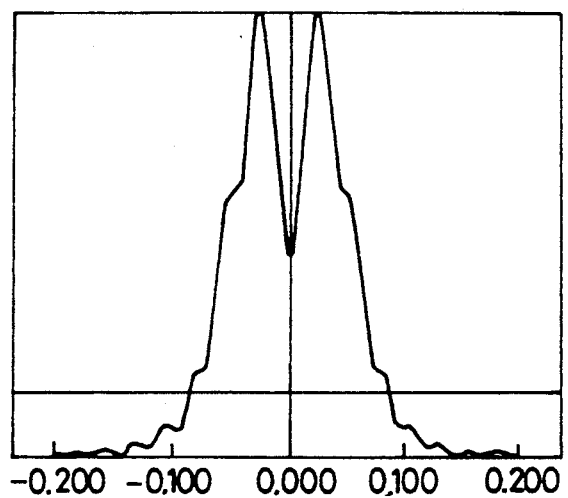
Figure 6D:
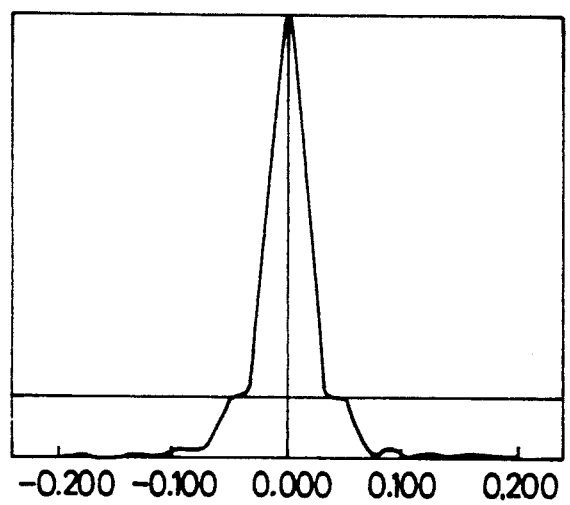

In an optical arrangement of the second type of general optical scanner, the real image 3B of the aperture 3 generally located in the vicinity of the scanned face 7. This means that the scanned face 7 is separated from the image 1B. The light intensity distribution of the light spot on the scanned face 7 is greatly changed as shown in FIGS. 6b, 6c and 6d and the diameter of the light spot is increased. When the real image 3B of the aperture is formed in the vicinity of the scanned face 7, it is necessary that the diameter of the opening image in the cross scan-corresponding direction with respect to the real image 3B is close to the diameter of the light spot to be realized. Accordingly, the value of ratio R/D is very large with respect to the diameter of the light spot to be obtained. In such a state, the light beam diameter in each of FIGS. 6e to 6h is greatly changed.

The inventor of this application examined the relation between the above-mentioned ratio R/D and a waist diameter $W_0$ of a beam to be obtained between the real image 3B of the aperture and the image 1B of the light emitting section of the laser diode light source. The inventor found that this relation is provided as shown by a graph in FIG. 4. In this graph, the axis of abscissa shows the ratio R/D and the axis of ordinate shows the beam waist diameter $W_0$.

Figure 4:
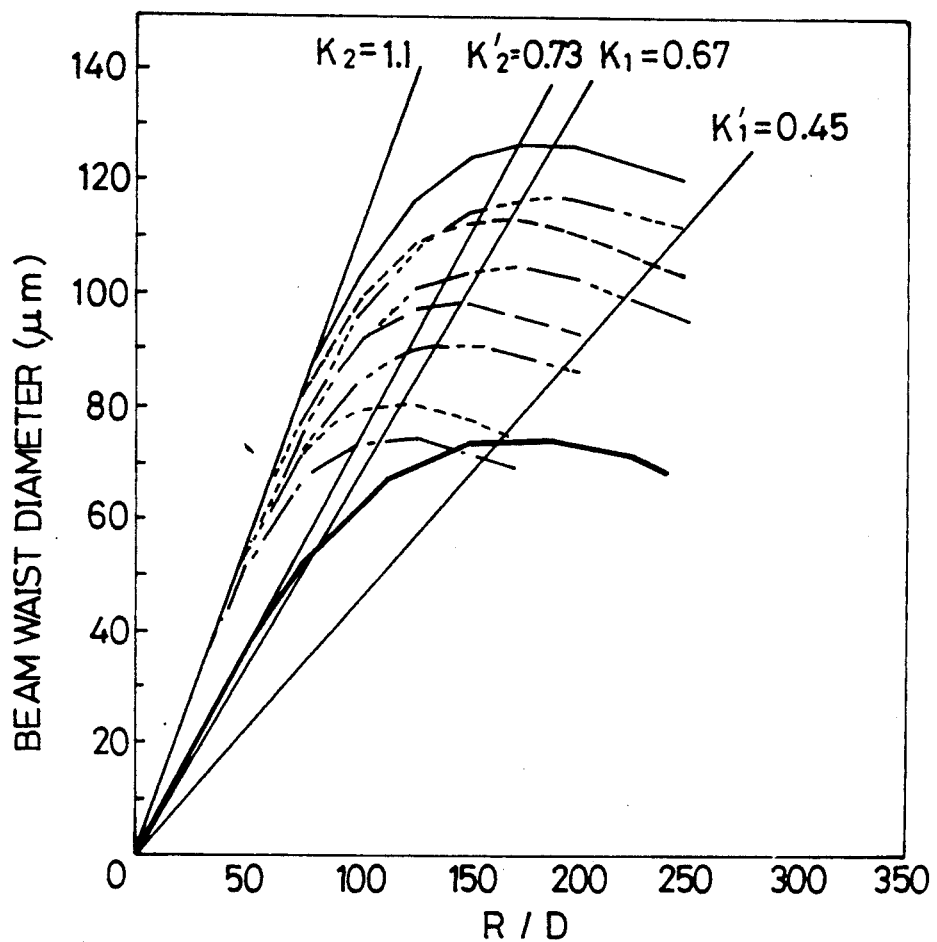
FIG. 4 is a graph for explaining features of the optical scanner having a first structure of the present invention.

Parameters of each of curves shown in FIG. 4 are provided by the distance R, a light-interrupting state of the aperture, and a wavelength. Reference numeral RECT shows a case in which the opening of the aperture is sufficiently small in comparison with the diameter of a light beam incident to the aperture so that the light intensity distribution can be considered to be rectangular. Reference numeral 40% GAUS shows a case in which a light beam portion having an intensity value equal to or smaller than 40% of a peak intensity value of the incident light beam having a Gaussian distribution is interrupted by the aperture. This 40% is set on the basis of the following reasons. Namely, the light intensity level of 40% is provided as 1/1.5 times value $1/e^2$ and an upper limit of a divergent angle of the light beam emitted from the laser diode light source is equal to a value about twice a lower limit thereof. Accordingly, 40% is set as a width such that noise light at an intensity level equal to or smaller than $1/e^2$ can be interrupted even when the lower limit of the divergent angle is used as a central divergent angle.

In FIG. 4, thick solid, broken and chain lines relate to a wavelength 780 nm, and a thin solid line relates to a wavelength 520 nm. When the value of distance R is small, the respective curves have a common tangential line every wavelength. Namely, in FIG. 4, reference numeral $k_2$ designates an inclination of the common tangential line of a curve group with respect to the wavelength 780 nm. Reference numeral $k_2'$ designates an inclination of a tangential line of curves with respect to the wavelength 520 nm. In this embodiment, $k_2$ and $k_2'$ are respectively equal to 1.1 and 0.73. The inclination $k_2$ is equal to 1.1 when the opening of the aperture is accurately rectangular. This inclination $k_2$ is slightly larger than this value 1.1 in the case of 40% GAUS.

When the value of distance R is sufficiently large, the beam waist diameter $W_0$ is approximately provided as a value on each of these tangential lines. A value of this beam waist diameter $W_0$ is provided by the relation between the ratio R/D and a Fraunhofer diffraction image. In contrast to this, the respective curves shown in FIG. 4 are gradually separated from the tangential lines as the ratio R/D is increased. The beam waist diameter is reduced after this beam waist diameter is locally maximized.

Accordingly, a condition for obtaining the beam waist diameter smaller than a diametrical size of the Fraunhofer diffraction image is provided as follows with respect to the wavelengths 780 nm and 520 nm, $$R/D > W_0/k_2, \quad R/D > W_0/k_2'$$

When the value of ratio R/D is excessively increased with respect to the beam waist diameter to be obtained, the light beam diameter is greatly changed as shown in FIGS. 6e to 6i as mentioned above so that a margin of the diameter of the light spot in a depth direction is reduced.

A range of this reduction is shown by a straight line connecting maximum values of the curves shown in FIG. 4. An inclination of this straight line is provided as $k_1 = 0.67$ with respect to the wavelength 780 nm. This inclination is slightly reduced in comparison with $k_1 = 0.67$ with respect to the rectangular incident light beam in the case of 40% GAUS. This inclination is provided as $k_1' = 0.45$ with respect to the wavelength 520 nm. Accordingly, a condition for providing a depth margin about an obtained beam waist is provided as follows with respect to the wavelengths 780 nm and 520 nm, $$R/D < W_0/k_1, \quad R/D < W_0/k_1'$$

In the following description, wavelength $\lambda_0$ is set to 780 nm as a reference. Further, new parameters $k_1 = 0.67\lambda/\lambda_0$ and $k_2 = 1.1\lambda/\lambda_0$ are introduced instead of the above inclinations $k_1$, $k_2$, $k_1'$ and $k_2'$. In this case, a condition for providing the depth margin and the beam waist diameter smaller than that of the Fraunhofer diffraction image is provided as follows with respect to the general wavelength $\lambda$, $$W_0/k_2 < R/D < W_0/k_1$$

Figure 1B:
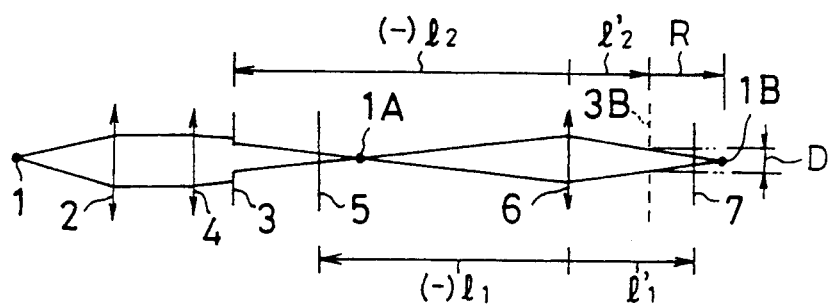

FIG. 1b shows an optical arrangement in which positions of the aperture 3 and the cylindrical lens 4 are opposite to each other in the optical arrangement shown in FIG. 1a. The above-mentioned conditions are similarly formed in such an optical arrangement shown in FIG. 1b.

Figure 1C:
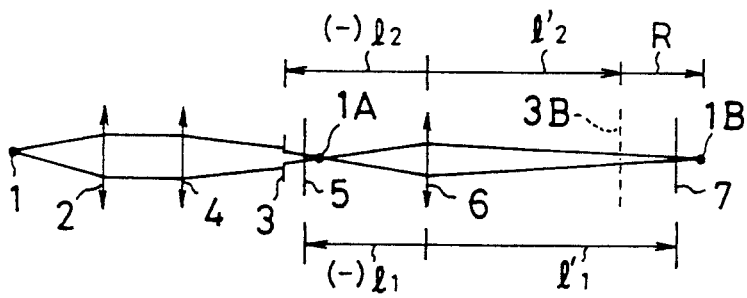

FIG. 1c shows an optical arrangement in which the present invention is applied to the first type of general optical scanner.

In this optical arrangement, an aperture 3 is arranged in proximity to a deflecting/reflecting face 5 between a cylindrical lens 4 and the deflecting/reflecting face 5. Further, the optical scanner is set such that a linear image 1A is formed in the vicinity of the deflecting/reflecting face 5 and is located backward from the aperture 3 seen from the side of a laser diode light source 1. Positions of the deflecting/reflecting face 5 and a scanned face 7 are set by an image-forming optical system 6 in a conjugate relation with respect to a cross scan-corresponding direction. Accordingly, a real image 3B of the aperture 3 located on the light source side from the deflecting/reflecting face 5 can be formed on the side of a rotary polygon mirror with respect to the scanned face 7. Accordingly, it is necessary to form the above linear image 1A on a side of the scanned face 7 with respect to the aperture 3 so as to set the diameter of a light spot to be smaller than the diameter of an opening image with respect to the real image 3B in the cross scan-corresponding direction.

In the optical arrangements shown in FIGS. 1b and 1c, no aperture 3 is arranged between the coupling lens 2 and the cylindrical lens 4 constituting an anamorphic optical system. Accordingly, in such a case, the coupling lens 2 and the cylindrical lens 4 can be replaced with an anamorphic single lens.

Figure 1D:
Figure 1E:

FIGS. 1d and 1e are explanatory views showing one example of such a case. FIG. 1d shows an optical action of the optical scanner in a main scan-corresponding direction. FIG. 1e shows an optical action of the optical scanner in a cross scan-corresponding direction.

In FIGS. 1d and 1e, an anamorphic single lens 2' has a function of a collimator lens as a coupling lens in the main scan-corresponding direction and changes a divergent light beam emitted from a laser diode light source 1 to a parallel light beam. The anamorphic single lens 2' changes the light beam to a convergent light beam in the cross scan-corresponding direction. It should be easily understood that an optical state after an aperture can be set to an optical state completely similar to that in the optical arrangement shown in FIG. 1b or 1c by a combination of the aperture and the light beam emitted from the single lens 2'.

The operation of an optical scanner having a second structure of the present invention will next be described.

As shown in FIGS. 1a to 1e, the real image 3B of the aperture 3 is located on the side of the rotary polygon mirror with respect to the scanned face 7. The image 1B of the light emitting section of the laser diode light source is located on a side opposite to the real image 3B with respect to the scanned face 7.

When the image 1B of the light emitting section of the laser diode light source is located on the side of the rotary polygon mirror with respect to the scanned face 7, the diameter of a light spot on the scanned face 7 is greater than the diametrical size of a Fraunhofer diffraction image so that no diameter of the light spot can be sufficiently reduced. Accordingly, it is preferable to arrange the scanned face 7 between the real image 3B of the aperture and the image 1B of the light emitting section of the laser diode light source. In this case, a beam waist is formed between these images 3B and 1B so that a diameter of the light spot close to a beam waist diameter can be obtained.

In FIGS. 6a to 6i, the relation between the light beam diameter and a defocusing amount, i.e., the depth characteristics of the light beam diameter, are generally provided as shown by the curve of a thick solid line in the case of the second type of general optical scanner. The beam waist is formed on the side of the rotary polygon mirror with respect to a position of the image 1B having the value of a defocusing amount equal to zero. In FIGS. 6a to 6i, the beam waist is formed at the depth of −3.5 mm.

Figure 6E:
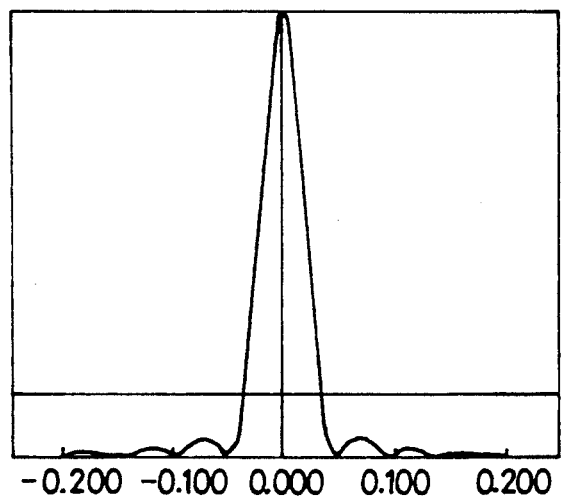
Figure 6F:
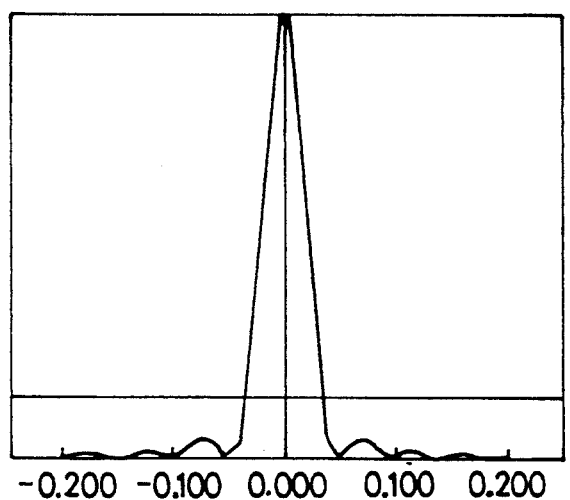
Figure 6G:
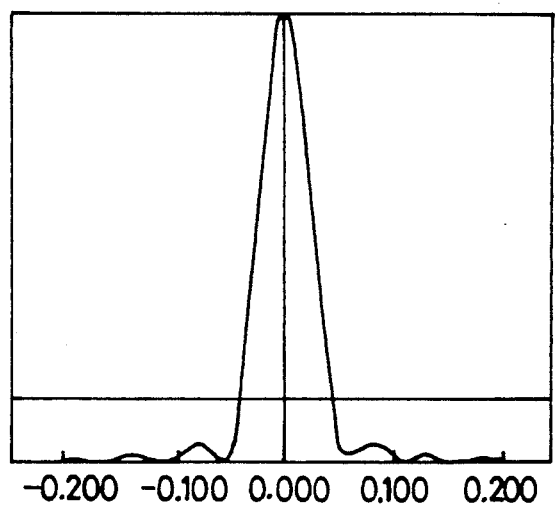
Figure 6H:
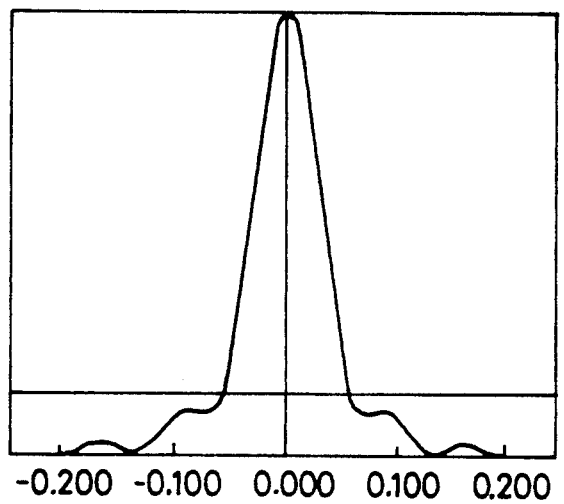
Figure 6I:
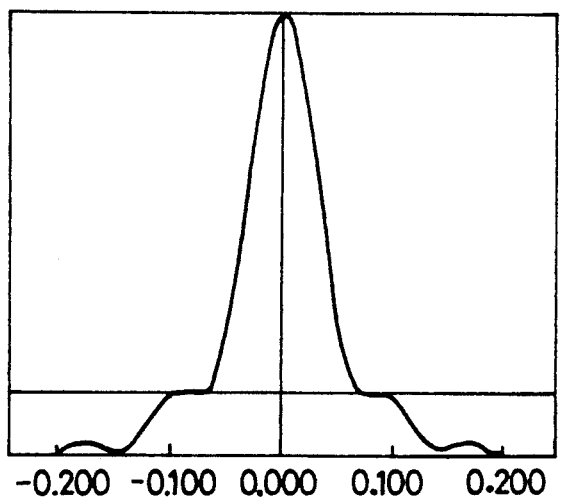

The position of the beam waist can be set on the side of the rotary polygon mirror with respect to the scanned face 7 in an entire effective scanning region, and the scanned face 7 can be arranged between this beam waist position and the image 1B formed backward from the scanned face. In this case, a light intensity distribution of the light spot on the scanned face 7 is provided as a clear Gaussian distribution as shown in FIGS. 6e, 6f and 6g, thereby reducing the diameter of the light spot. When the beam waist position is located backward from the scanned face 7, a basic intensity portion of the light intensity distribution of the light spot is increased as shown in FIG. 6d even when the defocusing amount is small, thereby causing defocusing of the light spot.

Accordingly, it is possible to realize a stable light spot having a small diameter by satisfying the above-mentioned condition with respect to the second structure of the present invention. At this time, it is also possible to obtain a light spot having an arbitrary diameter by satisfying the above-mentioned condition with respect to the first structure of the present invention.

The operation of an optical scanner having a third structure of the present invention will next be described.

Figure 5:
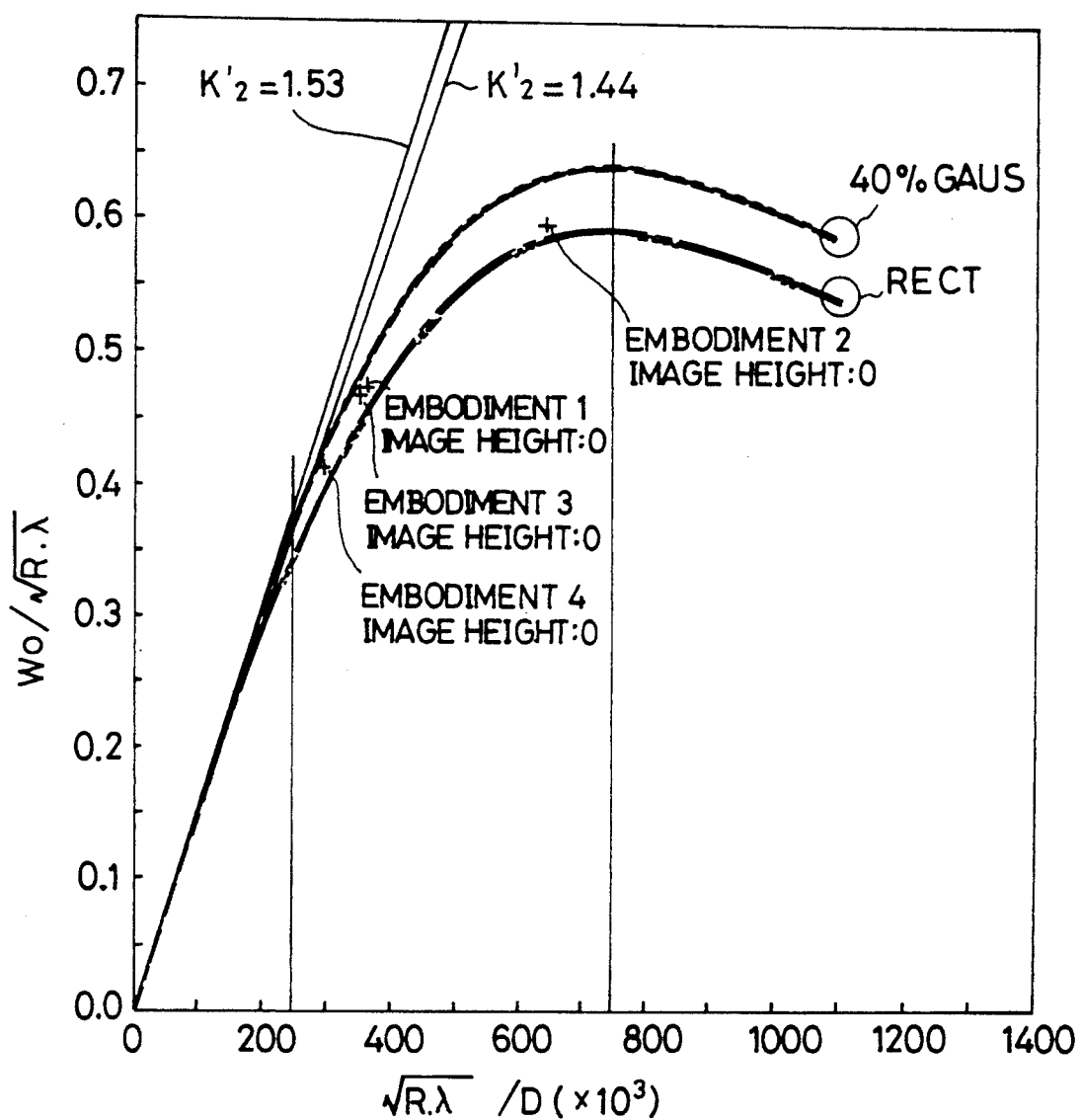
FIG. 5 is a graph for explaining features of the optical scanner having a third structure of the present invention.

FIG. 5 shows the relation between the above-mentioned R, D, $\lambda$ and a waist diameter $W_0$ of a beam to be obtained between the real image 3B of the aperture 3 and the image 1B of the light emitting section of the laser diode light source.

In FIG. 5, the axis of abscissa shows $\sqrt{[R\lambda]}/D$ and the axis of ordinate shows $W_0/\sqrt{[R\lambda]}$. Parameters of respective curves are provided by the distance R, a light-interrupting state of the aperture, and a wavelength. The meanings of reference numerals RECT and 40% GAUS are similar to those explained in the case of FIG. 4.

From FIG. 5, it is understood that the relation between $W_0/\sqrt{[R\lambda]}$ on the axis of ordinate and $\sqrt{[R\lambda]}/D$ on the axis of abscissa is shown by each of the curves in accordance with the light-interrupting state of the aperture irrespective of differences between values of R, D and $\lambda$. A straight line illustrated in FIG. 5 shows an inclination of each of the curves in each light-interrupting state of the aperture in a region in which a value of $\sqrt{[R\lambda]}/D$ is small. When values of F-number (F/No represented by R/D) of the real image of the aperture are equal to each other with respect to this straight line, it means that the distance R is large in comparison with $\sqrt{[R]}$. In other words, in this case, it means that the distance R is large.

In FIG. 6, when the distance R is equal to 200 mm showing a larger value, R/D=62.5 and $\lambda$=780 nm are formed so that $\sqrt{[R\lambda]}/D$ is approximately equal to 158. In FIG. 4, a straight line and a curve almost overlap each other in the vicinity of a value 158 of R/D on the axis of abscissa. With respect to the curve of R=200 mm in FIG. 6a, the beam waist is located in a position in which the defocusing amount is approximately equal to zero. This position of the beam waist is in conformity with the position of an image of the light emitting section of the laser diode light source. Accordingly, the beam waist diameter is approximately equal to that of a Fraunhofer diffraction image. Therefore, it is understood that the straight line shown in FIG. 4 shows a diametrical size of the Fraunhofer diffraction image, i.e., the diameter of a light beam at an image point of the light emitting section of the laser diode light source.

Accordingly, since $W_0/\sqrt{[R\lambda]}$ on the axis of ordinate in FIG. 5 is proportional to the beam waist diameter, a condition for obtaining the beam waist diameter smaller than the diametrical size of the Fraunhofer diffraction image is provided in a range in which a curve is located on the lower side of a straight line shown in FIG. 5.

In general, dispersion in the diameter of a light spot in the optical scanner is considered to be ±5% or more by dispersion in divergent angle of the divergent light beam from the laser diode light source, and dispersion in accuracy of the optical system. Accordingly, it is necessary that the diameter of the light spot is a diameter reduced by about −5% and less with respect to the diametrical size of the Fraunhofer diffraction image to reduce the beam waist with a margin. Therefore, it is necessary that the value of $\sqrt{[R\lambda]}/D$ is equal to or greater than 0.25 from FIG. 5. At this value of $\sqrt{[R\lambda]}/D$, a ratio of the beam waist diameter and the diametrical size of the Fraunhofer diffraction image is provided as follows in the light-interrupting state of the aperture,

| | beam waist diameter: | size of Fraunhofer diffraction image |
|---|---|---|
| when RECT | 0.94:1 | |
| when 40% GAUS | 0.94:1 | |

In both cases, the beam waist diameter is approximately reduced by −6.0%.

From FIG. 5, there is a tendency that $\sqrt{[R\lambda]}/D$ has a peak value of 0.75 in both curves and the beam waist diameter with respect to each of these curves is reduced when the value of $\sqrt{[R\lambda]}/D$ is greater than this peak value. A large value of $\sqrt{[R\lambda]}/D$ means that the value of R/D is increased at the same wavelength $\lambda$.

As mentioned above, the diameter of a light beam is greatly changed as shown in FIGS. 6e to 6i when the value of R/D is excessively increased with respect to the beam waist diameter to be obtained. Accordingly, a margin of the diameter of the light spot in a depth direction is reduced. A range of this reduction is equal to a range in which the value of $\sqrt{[R\lambda]}/D$ shown in FIG. 5 exceeds the above peak value. In this range, the beam waist position approaches a position of the real image of the aperture in comparison with a position of the image of the light emitting section of the laser diode light source. Namely, a range for providing a great change in diameter of the light beam and shown in FIGS. 6e to 6i further approaches the beam waist position. Accordingly, a condition for stably obtaining the diameter of the light spot and a light intensity distribution in the vicinity of the beam waist position is provided as follows, $$\sqrt{[R \cdot \lambda]}/D < 0.75$$

A condition for stably providing a small diameter of the light spot can be provided as follows, $$0.25 < \sqrt{[R \cdot \lambda]}/D < 0.75$$

The above-mentioned description about FIGS. 1b and 1c described before the explanation of the operation of the optical scanner having the second structure of the present invention is applied as it is in the case of the optical scanner having the third structure of the present invention. In the optical scanner having the third structure, a single lens structure can be used as an anamorphic optical system as explained with reference to FIGS. 1d and 1e.

The operation of an optical scanner having a fourth structure of the present invention will next be described.

As mentioned above, an image 3B of the aperture 3 is formed on the side of a rotary polygon mirror with respect to the scanned face 7. In FIGS. 1a to 1e, the deflecting/reflecting face 5 and the scanned face 7 are set by the image-forming optical system 6 in a conjugate relation with respect to the cross scan-corresponding direction. Accordingly, when the real image 3B of the aperture 3 is formed on the side of the rotary polygon mirror with respect to the scanned face, it is necessary that positions of the aperture 3 shown in FIGS. 1b, 1c, 1d and 1e or a position of the virtual image 3A of the aperture shown in FIG. 1a is located on the light source side with respect to the deflecting/reflecting face 5, or is located on the scanned face side with respect to the position of a front focal point of the cylindrical lens 4.

When the aperture 3 is arranged in the vicinity of the focal point of the cylindrical lens 4, the real image 3B of the aperture 3 is formed in the vicinity of the position of a rear focal point of the image-forming optical system 6. At this time, the diameter of an opening image with respect to the real image 3B is provided as a magnification determined by a ratio of focal lengths of the cylindrical lens 4 and the image-forming optical system 6. In this case, when the position of the real image 3B of the aperture approaches the scanned face 7, the diameter of a light beam is greatly changed in the vicinity of the scanned face as explained with reference to FIGS. 6a to 6i so that no clear light intensity distribution can be obtained.

In the above conditional range described in the first structure of the present invention, a beam waist is located in a position separated from the real image 3B of the aperture by a distance equal to or greater than 50% of the distance R. In the general optical scanner, it is considered that a minimum diameter of the light spot is about 25 to 50 $\mu$m in an optical scanning operation of high density. In contrast to this, a maximum diameter of the beam spot is proportional to a square root of the distance R in the same condition of incident light. Accordingly, it is considered from FIG. 4 that the distance R for providing the diameter of the light spot ranged from 25 to 50 $\mu$m is approximately equal to about 10 mm when the wavelength is set to 780 nm. In accordance with the second structure of the present invention, it is also considered that the distance between the scanned face 7 and the real image 3B of the aperture is equal to or smaller than this value of the distance R. It is necessary that the distance between the scanned face 7 and the real image 3B of the aperture is longer than at least 10 mm. This distance is also proportional to wavelength. Accordingly, this distance is equal to $10\lambda_0/\lambda$ mm by setting $\lambda_0$ to 780 nm with respect to a wavelength except for 780 nm.

In the optical scanner shown in FIG. 1a, it is necessary to dispose the aperture 3 on the light source side with respect to the position of the front focal point of the cylindrical lens so as to locate the real image 3B of the aperture on the side of the rotary polygon mirror with respect to the position of a rear combined focal point of the image-forming optical system 6. In such an optical arrangement, the distance from the position of the deflecting/reflecting face to the light source is increased so that the optical scanner is large-sized and this arrangement is therefore not preferable. The reduction of a focal length of the cylindrical lens is considered as a method for reducing this distance. However, in such a method, an enlargement magnification of the aperture is increased so that it is necessary to reduce an opening width of the aperture in the cross scan-corresponding direction. Therefore, the quantity of light is not preferable in this method. Accordingly, to facilitate and make the optical arrangements of the first, second and third structures compact, it is effective to dislocate the position of the rear combined focal point of the image-forming optical system 6 by the above distance $10\lambda_0/\lambda$ mm on the side of the rotary polygon mirror from the scanned face 7 in accordance with the fourth structure of the present invention.

Concrete embodiments of the present invention will next be described.

In these embodiments, the present invention is applied to an optical scanner shown in Japanese Patent Application No. 1-142470. This optical scanner belongs to the above-mentioned second type of general optical scanner. This optical scanner is of an optical arrangement type shown in FIG. 1a. The image-forming optical system is constructed by a combination of an f $\theta$ lens composed of two sets of spherical faces, and an elongated toroidal lens having a barrel type toroidal face. The laser diode light source is assumed to have a wavelength 780 nm.

With respect to various kinds of parameters in the optical arrangement after the aperture in the following respective embodiments, reference numerals r, d and n respectively designate a radius of curvature of a lens face, a distance between lens faces and a refractive index of a lens. Further, reference numeral $r_x$ designates a radius of curvature of an elongated toroidal lens face in the main scan-corresponding direction. Reference numeral $r_y$ designates a radius of curvature of the elongated toroidal lens face in the cross scan-corresponding direction.

Optical arrangements in Embodiments 1 and 2:

|  | r | d | n |
|---|---|---|---|
| aperature |  — | 27 | 1 |
| cylindrical lens | 8 | 3 | 1.511 |
|  | ∞ | 87 | 1 |
| deflecting/reflecting face | ∞ | 35.9 | 1 |
| image-forming lens: | −109.4 | 17.0 | 1.572 |
|  | −94.0 | 1.5 | 1 |
| f $\theta$ lens | ∞ | 19.8 | 1.572 |
|  | −127.7 | 93.8 | 1 |

| elongated lens | $r_x$ | $r_y$ | d | n |
|---|---|---|---|---|
|  | −700 | −35.7 | 3 | 1.572 |
|  | −700 | −17.6 | 82 | 1 |

The elongated toroidal lens face on the side of the rotary polygon mirror is toroidal in the cross scan-corresponding direction. The elongated toroidal lens face on the scanned face side is toroidal in the main scan-corresponding direction.

A half field anlge in an optical scanning operation is set to 35 degrees.

EMBODIMENT 1

The size of an opening of the aperture is set to 0.93 mm in the cross scanning direction. The incident light beam has a Gaussian distribution and a light beam portion having an intensity value equal to or smaller than 78% of a peak intensity value is interrupted in the cross scan-corresponding direction.

Values of the respective parameters are provided as follows when the height of an image formed by the light spot is set to 0 mm and 100 mm/;

| image height | 0 | 100 |
|---|---|---|
| R | 28.33 mm | 29.90 mm |
| D | 0.399 mm | 0.420 mm |
| R/D | 71.002 | 71.19 |
| $W_0$ | 70 μm | 71 μm |
| LZ | 25.07 mm | 28.70 mm |
| $W_0/k_1$ | 104.5 | 105.0 |
| $W_0/k_2$ | 63.6 | 64.5 |
| $\sqrt{[R \cdot \lambda]}/D$ | 0.373 | 0.364 |
| $W_0/\sqrt{[R \cdot \lambda]}$ | 0.471 | 0.465 |

The above parameter Z designates a distance between the real image of the aperture and the scanned face.

EMBODIMENT 2

An optical arrangement used in this Embodiment 2 is equal to that used in the above Embodiment 1. However, in this Embodiment 2, the opening of the aperture in the cross scanning direction is set to 0.53 mm. The incident light beam has a Gaussian distribution and a light beam portion having an intensity value equal to or smaller than 92% of a peak intensity value is interrupted in the cross scan-corresponding direction.

Values of the respective parameters are provided as follows when the height of an image formed by the light spot is set to 0 mm and 100 mm/:

| image height | 0 | 100 |
|---|---|---|
| R | 28.33 mm | 29.90 mm |
| D | 0.228 mm | 0.239 mm |
| R/D | 124.3 | 125.1 |
| $W_0$ | 88 μm | 91 μm |
| Z | 25.07 mm | 28.70 mm |
| $W_0/k_1$ | 131.3 | 135.8 |
| $W_0/k_2$ | 80.0 | 82.7 |
| $\sqrt{[R \cdot \lambda]}/D$ | 0.652 | 0.639 |
| $W_0/\sqrt{[R \cdot \lambda]}$ | 0.592 | 0.596 |

Optical arrangements in Embodiments 3 and 4:

| | r | d | n |
|---|---|---|---|
| aperture | — | 27 | 1 |
| cylindrical lens | 46 | 3 | 1.511 |
| | ∞ | 87 | 1 |
| deflecting/reflecting face | ∞ | 35.9 | 1 |
| image-forming lens: | −109.3 | 17.0 | 1.572 |
| | −94.0 | 1.5 | 1 |
| f θ lens | ∞ | 19.8 | 1.572 |
| | −127.7 | 93.8 | 1 |
| elongated lens | $r_x$ | $r_y$ | d | n |
| | −700 | −35.7 | 3 | 1.572 |
| | −700 | −17.6 | 82 | 1 |

The differences in optical arrangement between Embodiments 1 and 2 reside in only a structure in which the radius of curvature of a cylindrical lens face on an object side of the cylindrical lens is changed from 48 mm to 46 mm. A half field angle in the optical scanning operation is set to 35 degrees.

EMBODIMENT 3

The size of an opening of the aperture in the cross scanning direction is set to 0.93 mm. The incident light beam has a Gaussian distribution and a light beam portion having an intensity value equal to or smaller than 78% of a peak intensity value is interrupted in the cross scan-corresponding direction.

Values of the respective parameters are provided as follows when the height of an image formed by the light spot is set to 0 mm and 100 mm:

| image height | 0 | 100 |
|---|---|---|
| R | 26.53 mm | 28.10 mm |
| D | 0.405 mm | 0.426 mm |
| R/D | 65.51 | 65.96 |
| $W_0$ | 67 μm | 68 μm |
| Z | 25.01 mm | 28.78 mm |
| $W_0/k_1$ | 100 | 101.5 |
| $W_0/k_2$ | 60.9 | 61.8 |
| $\sqrt{[R \cdot \lambda]}/D$ | 0.355 | 0.348 |
| $W_0/\sqrt{[R \cdot \lambda]}$ | 0.466 | 0.459 |

EMBODIMENT 4

An optical arrangement used in this Embodiment 4 is equal to that used in the above Embodiment 3. However, in this Embodiment 4, the opening of the aperture in the cross scanning direction is set to 1.1 mm. The incident light beam has a Gaussian distribution and a light beam portion having an intensity value equal to or smaller than 71% of a peak intensity value is interrupted in the cross scan-corresponding direction.

Values of the respective parameters are provided as follows when the height of an image formed by the light spot is set to 0 mm and 100 mm:

| image height | 0 | 100 |
|---|---|---|
| R | 26.53 mm | 28.10 mm |
| D | 0.479 mm | 0.504 mm |
| R/D | 55.4 | 55.7 |
| $W_0$ | 59 μm | 60 μm |
| Z | 25.01 mm | 28.87 mm |
| $W_0/k_1$ | 88 | 89.6 |
| $W_0/k_2$ | 53.6 | 54.5 |
| $\sqrt{[R \cdot \lambda]}/D$ | 0.300 | 0.294 |
| $W_0/\sqrt{[R \cdot \lambda]}$ | 0.410 | 0.405 |

Figures 7A, 7B:
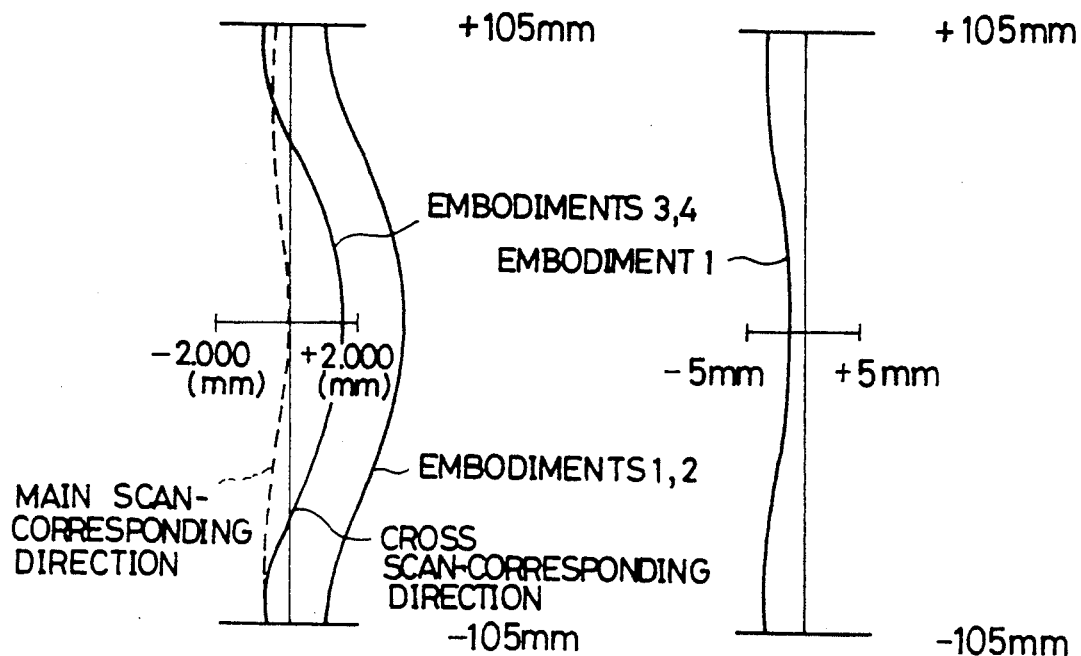
FIG. 7a is a view showing the position of an image formed by a light emitting section of a laser diode light source in each of embodiments of the present invention.
FIG. 7b is a view showing a beam waist position with respect to Embodiment 1 of the present invention.
Figure 8:
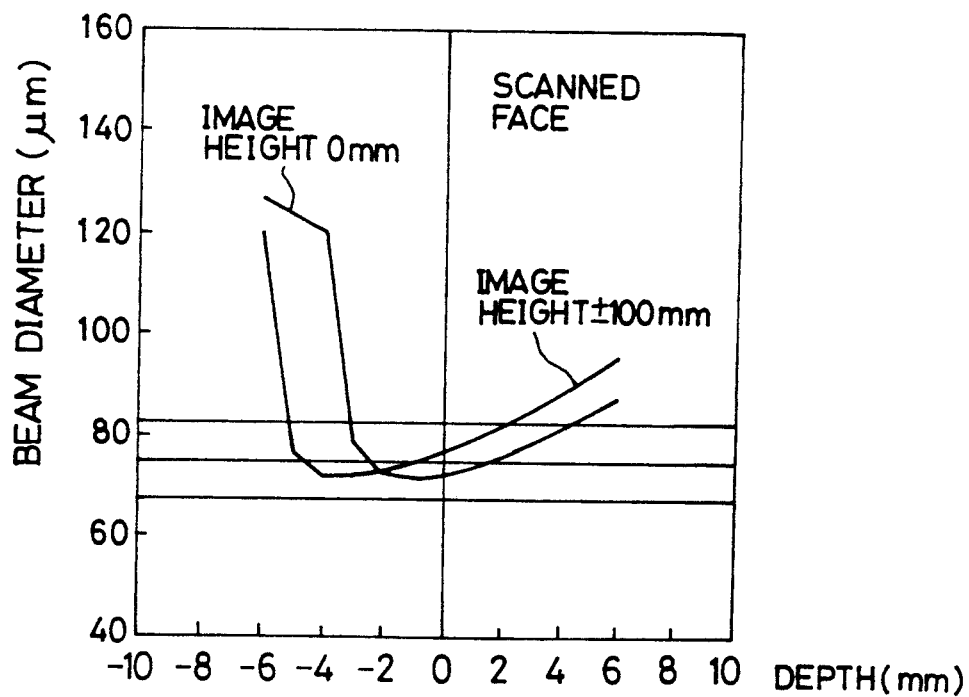
FIG. 8 is a graph showing depth characteristics of a light spot with respect to Embodiment 1 of the present invention.
Figure 9:
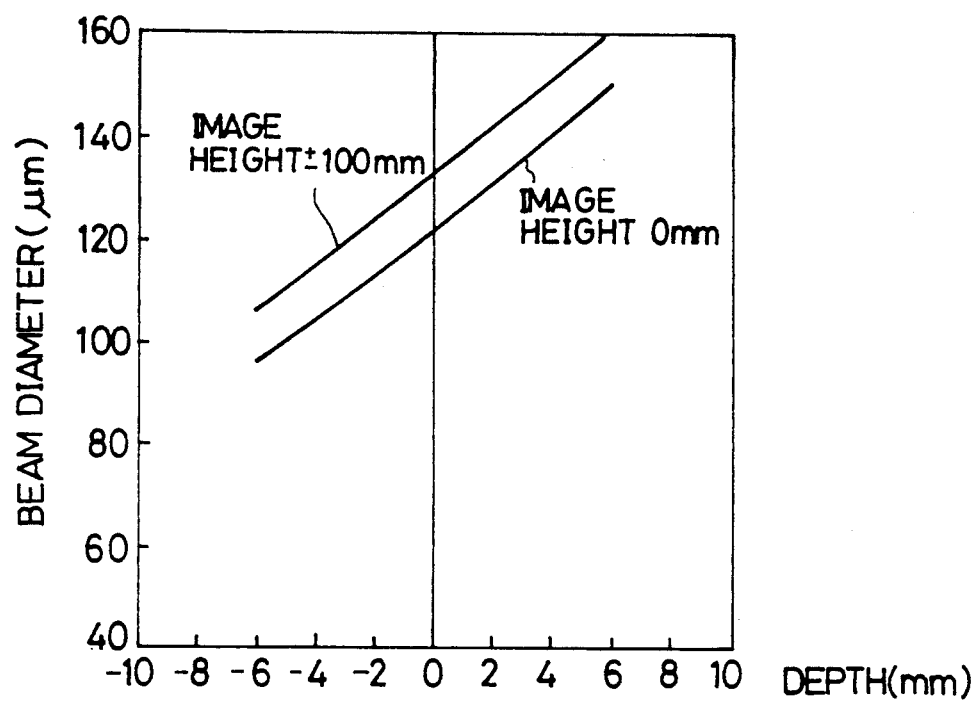
FIG. 9 is a graph showing depth characteristics of a light spot with respect to Embodiment 2 of the present invention.
Figure 10:
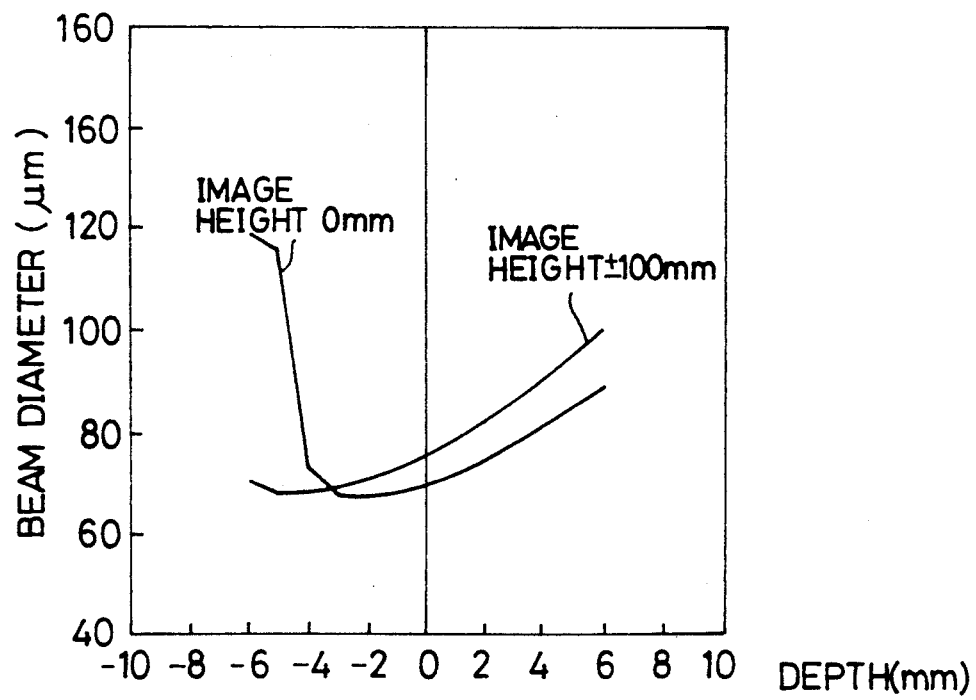
FIG. 10 is a graph showing depth characteristics of a light spot with respect to Embodiment 3 of the present invention.
Figure 11:
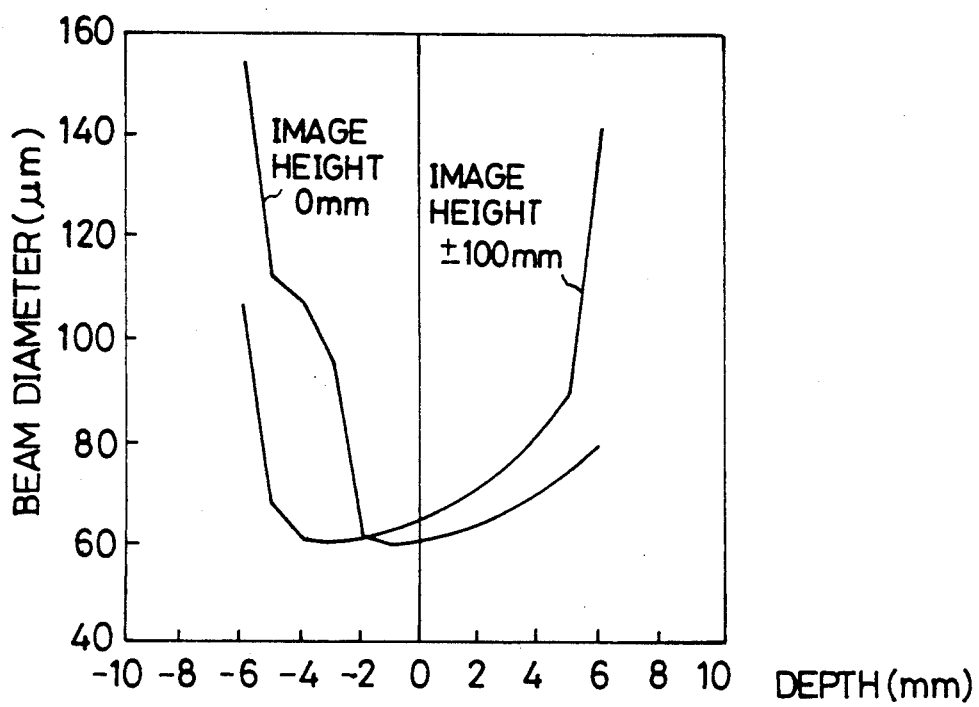
FIG. 11 is a graph showing depth characteristics of a light spot with respect to Embodiment 4 of the present invention.

FIG. 7a shows a forming position of the image 1B of the light emitting section of the laser diode light source in each of the main scan-corresponding direction and the cross scan-corresponding direction with respect to the above Embodiments 1 to 4. The forming position of the image 1B in the main scan-corresponding direction is shown by a broken line. The forming position of the image 1B in the cross scan-corresponding direction is shown by a solid line. As can be seen from numeric values of the parameters in the respective Embodiments, the Embodiments 1 to 4 relate to the optical scanners of the first and third structures of the present invention. The Embodiments 1 and 2 also relate to the optical scanner having the second structure of the present invention. An optical condition used in each of the Embodiments 3 and 4 is different from that of the optical scanner having the second structure since the forming position of the image 1B in each of the Embodiments 3 and 4 is located on the side of the rotary polygon mirror with respect to the scanned face in a portion of an effective scanning region as can be seen from FIG. 7a. FIG. 7b shows a beam waist position with respect to the Embodiment 1.

FIGS. 8, 9, 10 and 11 respectively show depth characteristics at the image heights 0 mm and 100 mm in the Embodiments 1, 2, 3 and 4.

Figure 12:
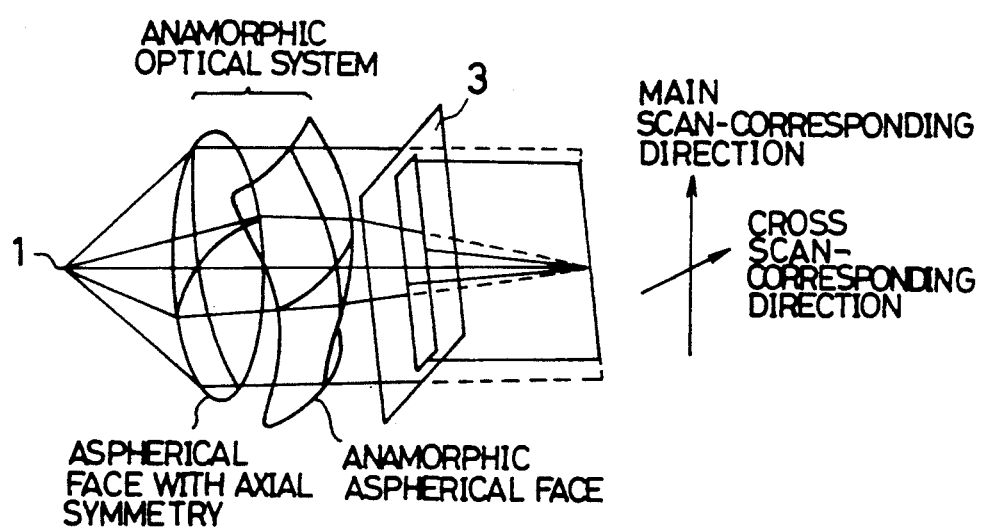
FIG. 12 is a view for explaining one example of a single lens disposed in the optical scanner having a ninth structure of the present invention.
Figure 13:
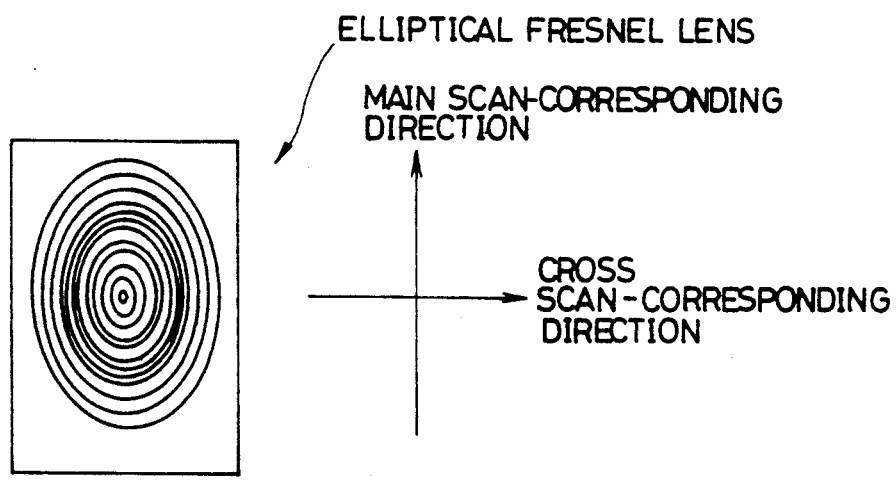
FIG. 13 is a view showing another example of the single lens disposed in the optical scanner having a ninth structure of the present invention.

FIGS. 12 and 13 show two concrete examples of an anamorphic optical system having a ninth structure of the present invention. In FIG. 12, the anamorphic optical system is constructed by a single lens. A face of this single lens on the laser diode light source side thereof is constructed by an aspherical face with symmetry of rotation. A face of this single lens on the aperture side thereof is constructed by an anamorphic aspherical face. In FIG. 13, the anamorphic optical system is constructed by an anamorphic elliptical Fresnel lens.

As mentioned above, in accordance with optical scanners having the first, second and third structures of the present invention, it is possible to realize a stable light spot having a small diameter and a clear light intensity distribution by applying the present invention to the general optical scanner. Such a light spot cannot be obtained in the general optical scanner. Further, in an optical scanner having the fourth structure of the present invention, the optical scanners having the first and second structures can be made compact and light utilization efficiency can be improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner in which a divergent light beam emitted from a laser diode light source is changed by an anamorphic optical system to a parallel or weak convergent light beam in a main scan-corresponding direction and a convergent light beam in a cross scan-corresponding direction, and a portion of the light beam is interrupted by an aperture and the light beam of a light emitting section of said laser diode light source is focused and formed as a linear image extending in the main scan-corresponding direction and is then deflected by a rotary polygon mirror, and the deflected light beam is converged by an image-forming optical system toward a scanned face to obtain a light spot on the scanned face and optically scan the scanned face by this light spot;

said image-forming optical system approximately setting the position of a deflecting/reflecting face of the rotary polygon mirror and a position of the scanned face in a conjugate relation in geometrical optics in the cross scan-corresponding direction;

said image-forming optical system having a function for converging said deflected light beam onto the scanned face in the main scan-corresponding direction;

the optical scanner being constructed such that a real image of the aperture formed by an image-forming element arranged between said aperture and the scanned face is located on a side of the rotary polygon mirror with respect to the scanned face in an entire effective scanning range; and an opening diameter and an arrangement position of the aperture, and a focal length and an arrangement position of the anamorphic optical system in the cross scan-corresponding direction being determined such that the following condition, $$W_0/k_2 < R/D < W_0/k_1$$

is satisfied where

R designates a distance between a position of said real image and a position of the image of the light emitting section of the laser diode light source formed by the image-forming element between said laser diode light source and the scanned face;

D designates a diameter of an opening image in the cross scan-corresponding direction with respect to the real image of said aperture;

$W_0$ designates a waist diameter of the deflected light beam to be obtained between said position of the real image and the image position of the light emitting section of the laser diode light source;

$\lambda$ designates a light emitting wavelength of the laser diode light source;

a wavelength $\lambda_0$ is set to 780 nm;

$k_1$ is equal to $0.67\lambda/\lambda_0$; and $k_2$ is equal to $1.1\lambda/\lambda_0$.

2. An optical scanner as claimed in claim 1, wherein a combined rear focal point of the image-forming optical system in the cross scan-corresponding direction is located on the side of the rotary polygon mirror by a distance equal to or greater than $10\lambda_0/\lambda$ mm from the scanned face.

3. An optical scanner as claimed in claim 1 or 2, wherein the anamorphic optical system is constructed by a coupling lens for coupling light from the laser diode light source and a cylindrical lens having refracting power only in the cross scan-corresponding direction.

4. An optical scanner as claimed in claim 3, wherein the aperture is arranged between the coupling lens and the cylindrical lens.

5. An optical scanner as claimed in claim 3, wherein the cylindrical lens is arranged between the coupling lens and the aperture.

6. An optical scanner as claimed in claim 3, wherein the coupling lens is constructed by a collimator lens and the aperture is arranged in proximity to the rotary polygon mirror and the linear image formed by the cylindrical lens is located in the vicinity of the deflecting/reflecting face of the rotary polygon mirror and is also located backward from the aperture seen from the laser diode light source.

7. An optical scanner as claimed in claim 1 or 2, wherein the anamorphic optical system is constructed by a single lens.

8. An optical scanner in which a divergent light beam emitted from a laser diode light source is changed by an anamorphic optical system to a parallel or weak convergent light beam in a main scan-corresponding direction and a convergent light beam in a cross scan-corresponding direction, and a portion of the light beam is interrupted by an aperture and the light beam of a light emitting section of said laser diode light source is focused and formed as a linear image extending in the main scan-corresponding direction and is then deflected by a rotary polygon mirror, and the deflected light beam is converged by an image-forming optical system toward a scanned face to obtain a light spot on the scanned face and optically scan the scanned face by this light spot;

said image-forming optical system approximately setting the position of a deflecting/reflecting face of the rotary polygon mirror and a position of the scanned face in a conjugate relation in geometrical optics in the cross scan-corresponding direction;

said image-forming optical system having a function for converging said deflected light beam onto the scanned face in the main scan-corresponding direction; and an opening diameter and an arrangement position of the aperture, and a focal length and an arrangement position of the anamorphic optical system in the cross scan-corresponding direction being determined such that a real image of the aperture formed by an image-forming element arranged between said aperture and the scanned face is located on a side of the rotary polygon mirror with respect to the scanned face in an entire effective scanning range;

the image of the light emitting section of the laser diode light source formed by the image-forming element between said laser diode light source and the scanned face is located on a side opposite to the real image of said aperture with respect to the scanned face in the entire effective scanning range; and a waist position of the deflected light beam is located between the image of the light emitting section and the real image of the aperture on the side of the rotary polygon mirror with respect to the scanned face.

9. An optical scanner as claimed in claim 8, wherein a combined rear focal point of the image-forming optical system in the cross scan-corresponding direction is located on the side of the rotary polygon mirror by a distance equal to or greater than $10\lambda_0/\lambda$ mm from the scanned face, where $\lambda_0$ is a wavelength set to 780 nm and $\lambda$ designates a light emitting wavelength of the laser diode light source.

10. An optical scanner as claimed in claim 8 or 9, wherein the anamorphic optical system is constructed by a coupling lens for coupling light from the laser diode light source and a cylindrical lens having refracting power only in the cross scan-corresponding direction.

11. An optical scanner as claimed in claim 10, wherein the aperture is arranged between the coupling lens and the cylindrical lens.

12. An optical scanner as claimed in claim 10, wherein the cylindrical lens is arranged between the coupling lens and the aperture.

13. An optical scanner as claimed in claim 10, wherein the coupling lens is constructed by a collimator lens and the aperture is arranged in proximity to the rotary polygon mirror and the linear image formed by the cylindrical lens is located in the vicinity of the deflecting/reflecting face of the rotary polygon mirror and is also located backward from the aperture seen from the laser diode light source.

14. An optical scanner as claimed in claim 8 or 9, wherein the anamorphic optical system is constructed by a single lens.

15. An optical scanner in which a divergent light beam emitted from a laser diode light source is changed by an anamorphic optical system to a parallel or weak convergent light beam in a main scan-corresponding direction and a convergent light beam in a cross scan-corresponding direction, and a portion of the light beam is interrupted by an aperture and the light beam of a light emitting section of said laser diode light source is focused and formed as a linear image extending in the main scan-corresponding direction and is then deflected by a rotary polygon mirror, and the deflected light beam is converged by an image-forming optical system toward a scanned face to obtain a light spot on the scanned face and optically scan the scanned face by this light spot;

said image-forming optical system approximately setting the position of a deflecting/reflecting face of the rotary polygon mirror and a position of the scanned face in a conjugate relation in geometrical optics in the cross scan-corresponding direction;

said image-forming optical system having a function for converging said deflected light beam onto the scanned face in the main scan-corresponding direction;

the optical scanner being constructed such that a real image of the aperture formed by an image-forming element arranged between said aperture and the scanned face is located on a side of the rotary polygon mirror with respect to the scanned face in an entire effective scanning range; and an opening diameter and an arrangement position of the aperture, and a focal length and an arrangement position of the anamorphic optical system in the cross scan-corresponding direction being determined such that the following condition, $$0.25 < \sqrt{[R \cdot \lambda]/D} < 0.75$$

is satisfied where $\sqrt{[\ ]}$ means a square root of a value within the bracket [ ];

R designates a distance between a position of said real image and a position of the image of the light emitting section of the laser diode light source formed by the image-forming element between said laser diode light source and the scanned face;

D designates a diameter of an opening image in the cross scan-corresponding direction with respect to the real image of said aperture; and $\lambda$ designates a light emitting wavelength of the laser diode light source.

16. An optical scanner as claimed in claim 15, wherein the anamorphic optical system is constructed by a coupling lens for coupling light from the laser diode light source and a cylindrical lens having refracting power only in the cross scan-corresponding direction.

17. An optical scanner as claimed in claim 16, wherein the aperture is arranged between the coupling lens and the cylindrical lens.

18. An optical scanner as claimed in claim 16, wherein the cylindrical lens is arranged between the coupling lens and the aperture.

19. An optical scanner as claimed in claim 16, wherein the coupling lens is constructed by a collimator lens and the aperture is arranged in proximity to the rotary polygon mirror and the linear image formed by the cylindrical lens is located in the vicinity of the deflecting/reflecting face of the rotary polygon mirror and is also located backward from the aperture seen from the laser diode light source.

20. An optical scanner as claimed in claim 15, wherein the anamorphic optical system is constructed by a single lens.

* * * * *